(12) United States Patent
Miura et al.

(10) Patent No.: US 8,429,823 B2
(45) Date of Patent: Apr. 30, 2013

(54) HUB UNIT MANUFACTURING METHOD AND HUB UNIT

(75) Inventors: Hiroyuki Miura, Nara (JP); Hiroshi Yoshikawa, Kadoma (JP); Yasuhiro Ohtani, Nabari (JP)

(73) Assignee: JTEKT Corporation, Osaka-Shi (JP)

( * ) Notice: Subject to any disclaimer, the term of this patent is extended or adjusted under 35 U.S.C. 154(b) by 1318 days.

(21) Appl. No.: 12/161,382

(22) PCT Filed: Jan. 18, 2007

(86) PCT No.: PCT/JP2007/050661
§ 371 (c)(1),
(2), (4) Date: Jul. 18, 2008

(87) PCT Pub. No.: WO2007/083688
PCT Pub. Date: Jul. 26, 2007

(65) Prior Publication Data
US 2010/0220950 A1 Sep. 2, 2010

(30) Foreign Application Priority Data

Jan. 20, 2006 (JP) .................................. 2006-012776
Jan. 23, 2006 (JP) .................................. 2006-013277

(51) Int. Cl.
*B21K 1/40* (2006.01)
*B21D 53/10* (2006.01)
*F16C 35/00* (2006.01)

(52) U.S. Cl.
USPC .............. 29/894.361; 29/407.05; 29/898.062; 29/898.063; 29/898.066; 384/544; 384/589

(58) Field of Classification Search ............... 29/407.05, 29/898.061, 898.1, 898.062, 898.063, 898.066, 29/894.36, 894.361, 894.362; 310/90; 384/544, 384/589; 33/517; 73/1.81; 301/105.1
See application file for complete search history.

(56) References Cited

U.S. PATENT DOCUMENTS 1,550,671 A * 8/1925 Brault .............................. 33/517
1,722,494 A * 7/1929 Brunner .......................... 451/52

(Continued)

FOREIGN PATENT DOCUMENTS

EP 1691090 A1 * 8/2006
JP 2-159536 A 6/1990

(Continued)

OTHER PUBLICATIONS

International Search Report for International Application No. PCT/JP2007/050661, mailed Apr. 10, 2007.

(Continued)

*Primary Examiner* — Alexander P Taousakis
(74) *Attorney, Agent, or Firm* — Nixon & Vanderhye P.C.

(57) ABSTRACT

In a state in which a first ball 103 is assembled in between a first inner peripheral raceway surface of an outer ring 105 and an outer peripheral raceway surface of a shaft 101, and a second ball 104 is placed in between a second inner peripheral raceway surface of the outer ring 105 and an outer peripheral surface of the shaft 101, a first distance "a" from a plane "q" generally perpendicular to a central axis "p" of the shaft 101 to the second ball 104 and a second distance "b" from the plane "q" to a stepped portion 107 of the shaft 101 are measured. Then, the size in the axial direction of the inner ring 102 is adjusted on the basis of a difference between the first distance "a" and the second distance "b".

5 Claims, 5 Drawing Sheets

U.S. PATENT DOCUMENTS

| | | | | |
|---|---|---|---|---|
| 2,223,799 | A * | 12/1940 | Annen | 72/75 |
| 2,551,471 | A * | 5/1951 | Snow | 33/532 |
| 2,784,485 | A * | 3/1957 | Aller | 29/898.063 |
| 4,454,640 | A * | 6/1984 | Egusa et al. | 29/898.063 |
| 5,022,267 | A * | 6/1991 | Shattuck et al. | 73/593 |
| 6,105,251 | A * | 8/2000 | Payen | 29/898.066 |
| 6,428,214 | B2 * | 8/2002 | Tajima et al. | 384/544 |
| 6,694,797 | B2 * | 2/2004 | Luik | 73/1.79 |
| 7,650,696 | B2 * | 1/2010 | Sensui et al. | 29/894.362 |
| 2001/0007600 | A1 * | 7/2001 | Tajima et al. | 384/544 |
| 2001/0016092 | A1 * | 8/2001 | Komaba et al. | 384/589 |
| 2002/0097040 | A1 * | 7/2002 | Takizawa et al. | 324/174 |
| 2006/0018579 | A1 * | 1/2006 | Yamamoto | 384/484 |
| 2007/0081752 | A1 * | 4/2007 | Kametaka et al. | 384/544 |
| 2007/0289385 | A1 * | 12/2007 | Kiuchi | 73/627 |
| 2008/0310784 | A1 * | 12/2008 | Ohtsuki | 384/544 |
| 2012/0269476 | A1 * | 10/2012 | Akimoto et al. | 384/569 |

FOREIGN PATENT DOCUMENTS

| | | |
|---|---|---|
| JP | 2000-65079 | 3/2000 |
| JP | 2001-18604 | 1/2001 |
| JP | 2002-188629 | 7/2005 |
| JP | 2005-325899 | 11/2005 |

OTHER PUBLICATIONS

English translation of the International Preliminary Report on Patentability mailed Jul. 22, 2008 in corresponding PCT Application No. PCT/JP2007/050661.

* cited by examiner

HUB UNIT MANUFACTURING METHOD AND HUB UNIT

This application is the U.S. national phase of International Application No. PCT/JP2007/050661, filed Jan. 18, 2007, which designated the U.S. and claims priority to Japan Application No. 2006-012776, filed Jan. 20, 2006, and Japan Application No. 2006-013277, filed Jan. 23, 2006, the entire contents of each of which are hereby incorporated by reference.

TECHNICAL FIELD

The present technology relates to a hub unit manufacturing method and a hub unit and, in particular, to the third-generation hub unit manufacturing method for mounting an inner ring on one end side of a shaft placed inside the inner periphery of an outer ring and the third-generation hub unit.

BACKGROUND ART

Conventionally, when a hub unit is manufactured by assembling a shaft, an inner ring, balls and an outer ring, it is necessary to measure the sizes of the each part in order to cope with variations in the measurement accuracy of the shaft, variations in the measurement accuracy of the inner ring, variations in the measurement accuracy of the outer ring, variations in the size of the balls within specifications thereof, changes in the inner ring raceway size due to press fitting of the inner ring to the shaft, dimensional changes depending on the temperature of each of the shaft, inner ring, balls and outer ring and so on. So, a great deal of time is necessary for the measurements and there is obstructive in shortening the production time of the hub unit and reducing the manufacturing cost.

Patent Document 1: JP H02-159536 A

DISCLOSURE OF THE TECHNOLOGY

It is an object of the present technology to provide a hub unit manufacturing method and a hub unit, which is able to easily set a prescribed preload or an axial gap even when the manufacturing size of the parts are not highly accurate and has a small number of assembling steps, a small assembly cycle time and a large extraction rate. A particular object of the present technology is to provide a hub unit manufacturing method capable of remarkably improving the accuracy in axial gap.

In order to accomplish the above object, there is provided, according to a first aspect of the present technology, a hub unit manufacturing method for manufacturing a hub unit, the hub unit comprising:

a shaft having a small diameter shaft portion and a large diameter shaft portion that connects to the small diameter shaft portion via a stepped portion and has an outside diameter larger than an outside diameter of the small diameter shaft portion and an outer peripheral raceway surface;

an inner ring that is fit to the small diameter shaft portion of the shaft and has an outer peripheral raceway surface;

an outer ring having a first inner peripheral raceway surface and a second inner peripheral raceway surface;

a first rolling element placed in between the first inner peripheral raceway surface and the outer peripheral raceway surface of the shaft; and a second rolling element placed in between the second inner peripheral raceway surface and the outer peripheral raceway surface of the inner ring, the method comprising:

placing the second rolling element in between the second inner peripheral raceway surface and an outer peripheral surface of the small diameter shaft portion as well as assembling the first rolling element in between the first inner peripheral raceway surface and the outer peripheral raceway surface of the large diameter shaft portion;

measuring a first distance from a plane generally perpendicular to a central axis of the shaft to the second rolling element and a second distance from the plane to the stepped portion of the shaft; and adjusting a size in an axial direction of the inner ring based on a difference between the first distance and the second distance.

According to the present technology, the first distance and the second distance are measured in a state in which the shaft, the outer ring, the first rolling element and the second rolling element are assembled, and the size in the axial direction of the inner ring is adjusted in accordance with the first distance and the second distance. Therefore, even if there are dimensional variations of the shaft, dimensional variations of the outer ring, dimensional variations of the first rolling element itself and dimensional variations of the second rolling element itself, the axial gap of the hub unit can be correctly set by adjusting the size in the axial direction of the inner ring. Moreover, even if there are similarly shaft measurement variations of the measuring instrument for measuring the size of the shaft and outer ring measurement variations of the measuring instrument for measuring the size of the outer ring, the axial gap of the hub unit can be correctly set by adjusting the size in the axial direction of the inner ring. Therefore, variations in the axial gap of the hub unit can be reduced more remarkably than variations in the conventional case. And the axial gap can be correctly set to the prescribed value as well as the durability of the hub unit and the performance of the load capacity and so on can be remarkably improved.

Moreover, according to the present technology, it is not necessary to carry out the dimensional measurement of the shaft, the dimensional measurement of the inner ring and the dimensional measurement of the outer ring or the target size can be made wide. Therefore, the production time of the hub unit can be remarkably reduced.

In one embodiment, the method comprises calculating an interference between the small diameter shaft portion of the shaft and the inner ring by measuring an inside diameter of the inner ring and an outside diameter of the small diameter shaft portion of the shaft; and adjusting the size in the axial direction of the inner ring in accordance with the calculated interference.

According to the above embodiment, the inside diameter of the inner ring and the outside diameter of the small diameter shaft portion of the shaft are measured, the interference between the shaft and the inner ring is calculated, and the size in the axial direction of the inner ring is adjusted in accordance with the calculated interference. Therefore, even if the axial gap of the hub unit fluctuates depending on the magnitude of interference, i.e., even if the axial gap of the hub unit fluctuates depending on the strength of press fitting of the inner ring, the axial gap of the hub unit can be correctly set by adjusting the size in the axial direction of the inner ring. Therefore, the axial gap of the hub unit can be brought closer to the prescribed value.

In one embodiment, the method comprises measuring temperatures of the shaft, the inner ring and the outer ring before the hub unit is assembled; and adjusting the size in the axial direction of the inner ring in accordance with the temperatures of the shaft, the inner ring and the outer ring.

According to the above embodiment, the size in the axial direction of the inner ring is adjusted in accordance with the temperatures of the parts. Therefore, even if the sizes of the parts are varied by thermal expansion, the axial gap of the hub unit can be correctly set by adjusting the size in the axial direction of the inner ring. Therefore, the axial gap of the hub unit can be brought closer to the prescribed value.

In one embodiment, the size in the axial direction of the inner ring is adjusted in accordance with variations in an axial gap of the hub unit due to calking effected on an end surface in the inner ring side of the shaft in order to fix the inner ring to the shaft, after the shaft, the inner ring, the first rolling element, the second rolling element and the outer ring are assembled.

According to the above embodiment, the size in the axial direction of the inner ring is adjusted in accordance with the valuations in the axial gap due to calking effected on the end surface in the inner ring side of the shaft, after the shaft, the inner ring, the first rolling elements, the second rolling elements and the outer ring are assembled. Therefore, even if the axial gap of the hub unit fluctuates due to calking effected on the end surface in the inner ring side of the shaft, the axial gap of the hub unit can be correctly set by adjusting the size in the axial direction of the inner ring. Therefore, the axial gap of the hub unit can be brought closer to the prescribed value.

In one embodiment, the method comprises charging a grease in between the first rolling element and the second rolling element in a space between the shaft and the outer ring after the first distance and the second distance are measured; and fitting the inner ring of which the size in the axial direction has been adjusted to the small diameter shaft portion of the shaft after the grease is charged.

According to the above embodiment, grease is charged in between the first rolling element and the second rolling element between the shaft and the outer ring after the first distance and the second distance are measured, and the inner ring of which the size in the axial direction has been adjusted is fit to the shaft after the grease is charged. Therefore, the grease exerts no influence on the measurements of the first distance and the second distance. Therefore, the axial gap of the hub unit can be accurately adjusted to the prescribed value.

Moreover, according to the above embodiment, since the parts assembled once need not be disassembled for the charging of the grease, time to manufacture the hub unit can be shortened, and the manufacturing cost of the hub unit can be reduced.

In order to accomplish the above object, there is provided, according to an another aspect of the present technology, a hub unit manufacturing method for manufacturing a hub unit, the hub unit comprising a shaft having a small diameter shaft portion and a large diameter shaft portion that connects to the small diameter shaft portion via a stepped portion and has an outside diameter larger than an outside diameter of the small diameter shaft portion; and an inner ring that is fit to the small diameter shaft portion of the shaft, the method comprising fastening a screw engagement portion formed in a first place on an inner peripheral surface of the inner ring to a screw engagement portion formed in a first place of an outer peripheral surface of the small diameter shaft portion in screw engagement as well as fitting a fitting portion formed in a second place of the inner peripheral surface of the inner ring to a fitting portion formed in a second place of the outer peripheral surface of the small diameter shaft portion by interference fit;

adjusting a preload or an axial gap by adjusting a screw engagement depth of the screw engagement portion of the small diameter shaft portion in relation to the screw engagement portion of the inner ring by relative screw rotation of the inner ring to the small diameter shaft portion; and effecting prevention of rigidity reduction of the inner ring due to fastening the screw engagement portion of the inner ring to the screw engagement portion of the small diameter shaft portion in screw engagement as well as jointing aligning of an outer peripheral raceway surface formed on an outer peripheral surface of the inner ring, by fitting of the fitting portion of the small diameter shaft portion to the fitting portion of the inner ring.

According to the present technology, not only the burden of high-accuracy size control of the members can be reduced but also the steps of the measurement of the members and the steps of the matching of the members can be eliminated. Therefore, the number of assembling steps can be reduced, the assembly cycle time can be shorted and the production yield can be made higher.

In order to accomplish the above object, there is provided, according to an another aspect of the present technology, a hub unit comprising:

a shaft having a small diameter shaft portion and a large diameter shaft portion that connects to the small diameter shaft portion via a stepped portion and has an outside diameter larger than an outside diameter of the small diameter shaft portion; and an inner ring having an outer peripheral raceway surface, wherein the small diameter shaft portion has a screw engagement portion and a fitting portion as well as the inner ring has a screw engagement portion and a fitting portion, the screw engagement portion of the inner ring is put in screw engagement with the screw engagement portion of the small diameter shaft portion so that a position in an axial direction of the inner ring can be adjusted with respect to the shaft, and the fitting portion of the inner ring is fit to the fitting portion of the small diameter shaft portion by interference fit so that the inner ring is concentrically coupled with the small diameter shaft portion.

It is acceptable to provide the fitting portion of the small diameter shaft portion and the inner ring as a fixed portion for fixing the small diameter shaft portion of the shaft to the inner ring or to provide a fixed portion by welding or bonding aside from the fitting portion of the small diameter shaft portion and the inner ring. Moreover, it is acceptable to fix the small diameter shaft portion of the shaft to the inner ring by expanding the diameter of the cylindrical portion of the outer end of the small diameter shaft portion of the inner ring.

According to the hub unit of the present technology, by adjusting the screw engagement depth of the screw engagement portion by screw rotation of the inner ring with respect to the small diameter shaft portion of the shaft, the required preload or axial gap can be set.

Moreover, reduction in the rigidity of the inner ring caused by backlash at the screw engagement portion and misalignment from central axis for the outer peripheral raceway surface of the inner ring can be prevented or suppressed by the fitting portion. The need for the conventionally performed preload management, i.e., the high-accuracy management of the pitch between the double row tracks on the outer ring side, the matching of the selection of ball diameter with respect to the inner and outer rings, the calking of the shaft end for giving the preload and so on, can be removed. As a consequence of which the number of assembling steps can be remarkably reduced and the manufacturing cost can be reduced.

In one embodiment, the screw engagement portion of the inner ring is situated axially closer to the large diameter shaft portion side than the outer peripheral raceway surface and the fitting portion of the inner ring.

In the hub unit of the present technology, the screw engagement portion of the inner ring should desirably be formed in a position axially displaced from the outer peripheral raceway surface of the inner ring. More concretely, it is desirable to provide the screw engagement portion closer to the large diameter shaft portion side (inner end side in the axial direction) than the outer peripheral raceway surface in the inner ring and to form the fitting portion closer to the outer end side (opposite from the large diameter shaft portion side of the screw engagement portion) in the axial direction than the screw engagement portion. When the screw engagement portion of the inner ring is situated in the position axially displaced from the outer peripheral raceway surface of the inner ring, the influence that the screw engagement portion exerts on the outer peripheral raceway surface of the inner ring becomes extremely small.

According to the hub unit and the hub unit manufacturing method of the present technology, the processing sizes of the members need not be highly accurate or it is not necessary to carry out the dimensional measurement of the shaft, the dimensional measurement of the inner ring and the dimensional measurement of the outer ring. Therefore, the prescribed preload or the axial gap can easily be set, the number of assembling steps can be reduced and the assembly cycle time to be reduced. Moreover, the manufacturing yield can be increased.

DETAILED DESCRIPTION OF THE TECHNOLOGY

Figure 1A:
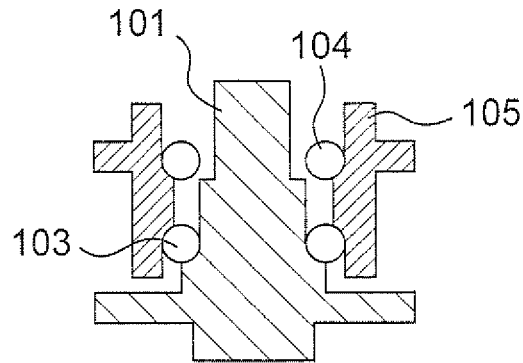
FIG. 1A is a view for explaining a hub unit manufacturing method according to one embodiment of the present technology.

The present technology will be described in detail below by the embodiments shown in the drawings.

FIGS. 1A through 1F are views for explaining the hub unit manufacturing method of one embodiment of the present technology.

The hub unit manufacturing method of the one embodiment of the present technology is described below with reference to FIGS. 1A through 1F. In FIGS. 1A through 1F, 101 indicates a shaft, 102 indicates an inner ring, 103 indicates a first ball as one example of the first rolling element, 104 indicates a second ball as one example of the second rolling element and 105 indicates an outer ring.

First of all, a subassembly step is carried out. In the subassembly step, the shaft 101, the outer ring 105, the first ball 103 and the second ball 104 are assembled so that the first ball 103 is assembled in between the outer peripheral raceway surface of the shaft 101 and a first inner peripheral raceway surface of the outer ring 105, and the second ball 104 is placed in between the outer peripheral surface of the shaft 101 and a second inner peripheral raceway surface of the outer ring 105. In this way, as shown in FIG. 1A, an assembly having the shaft 101, the outer ring 105, the first ball 103 and the second ball 104 is assembled.

Figure 1B:
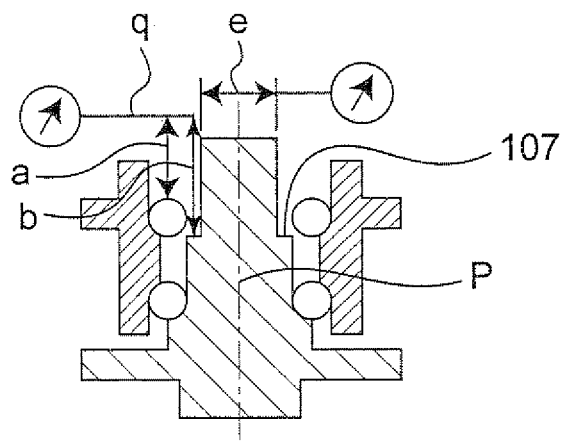
FIG. 1B is a view for explaining a hub unit manufacturing method according to one embodiment of the present technology.

Subsequently, a first distance measuring step and a second distance measuring step are carried out. It is noted that a temperature measuring step is carried out immediately before each of the measuring steps. In the temperature measuring step, temperatures of the shaft 101, the inner ring 102, the first ball 103, the second ball 104 and the outer ring 105 are measured, and the atmospheric temperature is measured. In the first distance measuring step and the second distance measuring step, after inserting a measuring jig (not shown) from an opening in the second ball 104 side located between the shaft 101 and the outer ring 105 in the assembly shown in FIG. 1A, bringing the second ball 104 in contact with the second inner peripheral raceway surface of the outer ring 105 and making it stationary on the second inner peripheral raceway surface, a first distance "a" from a plane "q" generally perpendicular to a first central axis "p" to the second ball 104 and a second distance "b" from the plane "q" to a stepped portion 107 of the shaft 101 are measured by using a distance measuring device such as a dial gauge as shown in FIG. 1B. It is acceptable to assemble the second ball 104 and measure the first distance "a" after measuring the first distance "b". At this time, measurement variations can be reduced when the distances "a" and "b" are measured while rotating the shaft 101 (or the outer ring 105).

Figure 1C:
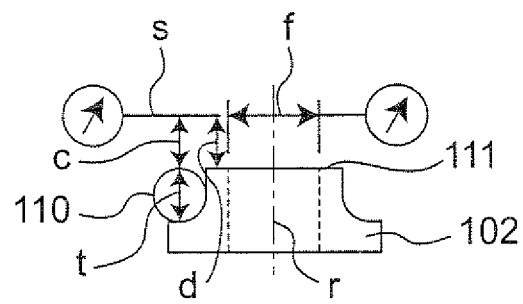
FIG. 1C is a view for explaining a hub unit manufacturing method according to one embodiment of the present technology.

Subsequently, an inner ring size measuring step is carried out. In the inner ring size measuring step, as shown in FIG. 1C, after a ball 110 (this may be a jig corresponding to the second ball 104 although not described in detail) of the same type (of the same specifications) as that of the second ball 104 is placed on the outer peripheral raceway surface of the inner ring 102, a third distance "c" from a plane "s" generally perpendicular to the central axis "r" of the inner ring 102 to the ball 110 and a fourth distance "d" from the plane "s" to a small end surface 111 of the inner ring 101 are measured.

Subsequently, an interference measuring step is carried out. In the interference measuring step, the outside diameter "e" of a small diameter shaft portion (shaft portion on the fitting side of the inner ring 102) of the shaft 101 of the assembly shown in FIG. 1B is measured by using a measuring instrument such as a dial gauge, and the inside diameter "f" of the inner ring 102 shown in FIG. 1C is measured by using a measuring instrument such as a dial gauge. Then, an interference (e−f) is detected.

Next, an inner ring size adjusting step is carried out. In the inner ring size adjusting step, the size in the axial direction of the inner ring 102 is adjusted in accordance with a difference (b−a) between the second distance "b" and the first distance "a", the third distance "c", the fourth distance "d", a dimensional change of the shaft 101 based on the measurement temperature of the shaft 101, a dimensional change of the inner ring 102 based on the measurement temperature of the inner ring 102, a dimensional change of the first ball 103 based on the measurement temperature of the first ball 103, a dimensional change of the second ball 104 based on the measurement temperature of the second ball 104, a dimensional change of the outer ring 105 based on the measurement temperature of the outer ring 105, the temperature in which the customer used the hub unit, the atmospheric temperature (the atmospheric temperature is used in a case where time from the manufacturing of the assembly shown in FIG. 1A to the measurement of the first distance and the second distance is long, and the temperatures of the shaft 101, the inner ring 102, the first ball 103, the second ball 104 and the outer ring 105 are considered to be equal to the atmospheric temperature), variations in the axial gap of the hub unit depending on the interference (expansion due to press fitting) (described below) and variations in the axial gap of the hub unit depending on the calking (described below).

Figure 1D:
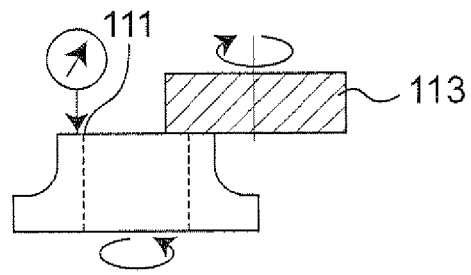
FIG. 1D is a view for explaining a hub unit manufacturing method according to one embodiment of the present technology.

In detail, as shown in FIG. 1D, the small end surface 111 of the inner ring 102 is brought in contact with a rotating grindstone 113 while rotating the inner ring 102. In this way, the small end surface 111 of the inner ring 102 is ground so that the size in the axial direction of the inner ring 102 is accurately adjusted to a size that is uniquely determined by the various factors described above. According to the method of the present embodiment, regardless of the size errors of the individual shaft 101, first ball 103, second ball 104 and outer ring 105, the adjustment of the size in the axial direction of the inner ring 102 is performed on the basis of the difference (b−a) between the second distance "b" and the first distance "a" which includes the total of those cumulative errors. In detail, the size in the axial direction of the inner ring 102 is increased by decreasing the amount of grinding of the small end surface 111 of the inner ring 102 when the difference (b−a) between the second distance "b" and the first distance "a" is large, while the size in the axial direction of the inner ring 102 is decreased by increasing the amount of grinding of the small end surface 111 of the inner ring 102 when the difference (b−a) between the second distance "b" and the first distance "a" is small. By this operation, the desired axial gap can be set simply accurately.

It has been confirmed through experiments that a negative gap (compression size) of the assembled hub unit is reduced when the value of the interference is increased. The variations in the axial gap of the hub unit depending on the interference means variations in the negative gap with respect to the interference.

Moreover, if the calking described later is performed, the negative gap (compression size) of the assembled hub unit varies depending on the materials of the parts such as the shaft and the inner ring and depending on the size of the hub unit. The variation value is calculated for each of the materials of the parts such as the shaft and the inner ring and is calculated for the size of the hub unit and stored in a data base. The variations in the axial gap of the hub unit depending on the calking means the variation value in the negative gap of the hub unit calculated for each of the materials of the parts such as the shaft and the inner ring and calculated for the size of the hub unit.

When the influences of the temperatures of the parts, interference and calking are ignored, the size in the axial direction of the inner ring is adjusted based on (c+t−d) obtained by subtracting the fourth distance "d" from (c+t) obtained by adding the diameter "t" of the ball 110 to the third distance "c" (see FIG. 1C) and (b−a) (in the present embodiment, the fluctuations in the axial gap attributed to the temperatures of the parts, interference and calking are compensated, and the method is not adopted).

Figure 1E:
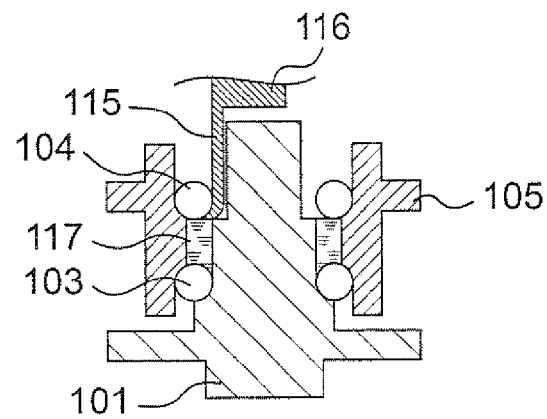
FIG. 1E is a view for explaining a hub unit manufacturing method according to one embodiment of the present technology.

Next, a grease charging step is carried out. In the grease charging step, as shown in FIG. 1E, by using a grease charger 116 that has an elongate nozzle 115, a grease 117 is charged in between the first ball 103 and the second ball 104 in the space between the shaft 101 and the outer ring 105 in the assembly shown in FIG. 1A.

Thereafter, an inner ring fitting step is carried out. In the inner ring fitting step, the inner peripheral surface of the inner ring 2 of which the size in the axial direction has been correctly adjusted is fitted to the outside of shaft 1 of the assembly charged with the grease shown in FIG. 1E by press fitting. In this way, the inner ring 2 is attached to the assembly charged with the grease.

Figure 1F:
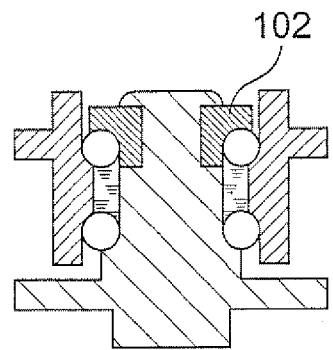
FIG. 1F is a view for explaining a hub unit manufacturing method according to one embodiment of the present technology.

Finally, a calking step is carried out. In the calking step, part of the shaft 101 is overlapped part of the end surface of the inner ring 102 as shown in FIG. 1F by calking the end surface in the inner ring 102 side of the shaft 101. In this way, the inner ring 102 is firmly fixed to the shaft 101 and the assembly of the hub unit is finished.

Figure 2:
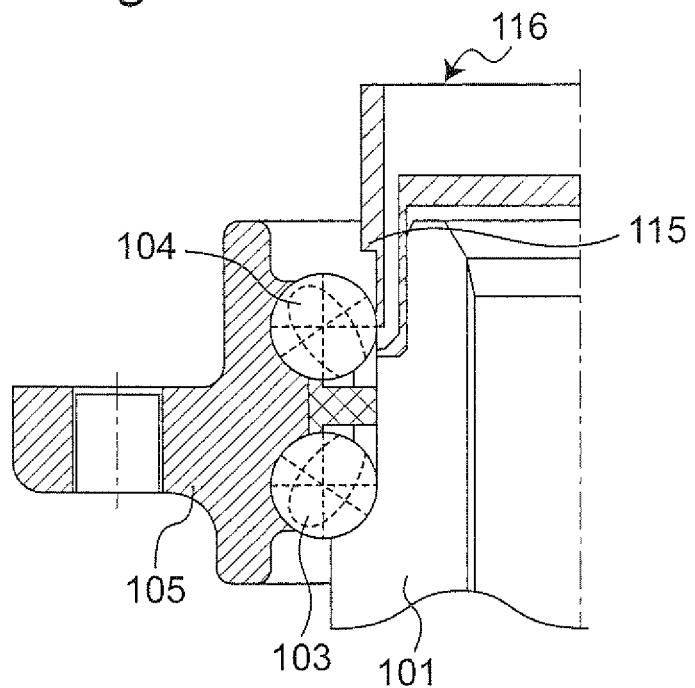
FIG. 2 is a partially enlarged view of a grease charging device being used in a grease charging step.
Figure 3:
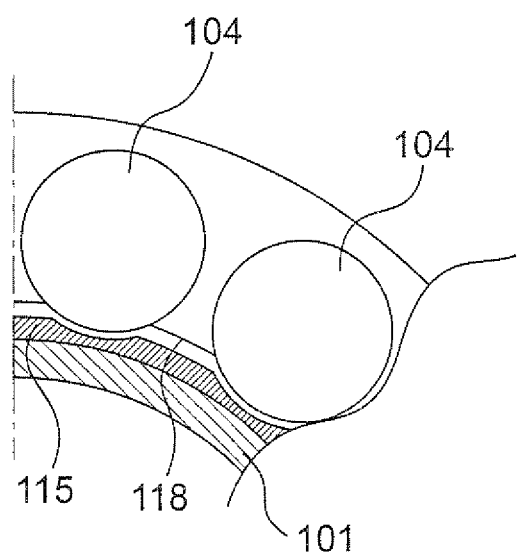
FIG. 3 is a sectional view in a radial direction that penetrates the center of the second ball.

FIG. 2 is a partially enlarged view of the grease charging device 116 used in the grease charging step, and FIG. 3 is a sectional view in a radial direction that crosses the center of the second ball 104. It is noted that the reference numeral 118 denotes the inner peripheral surface of a retainer in FIG. 3.

As shown in FIG. 2, the size in the radial direction of the nozzle 115 of the grease charging device 116 is smaller than a radial gap between the second ball 104 and the shaft 101. Moreover, the size in the axial direction of the nozzle 115 of the grease charging device 116 has a length approximately equivalent to a length from the end surface in the inner ring 102 side of the shaft 101 to the space between the first ball 103 and the second ball 104.

Moreover, as shown in FIG. 3, at least part of the outer peripheral surface in the circumferential direction of the nozzle 115 has a surface configuration that generally corresponds to a surface defined by the second balls 104 and the retainer that is retaining the second balls 104. As described above, since the configuration of the outer peripheral surface of the nozzle 115 is the surface configuration generally corresponding to the surface defined by the second ball 104 and the retainer that is retaining the second ball 104, grease can easily be charged into the space between the first ball 103 and the second ball 104. Moreover, since the portion of the nozzle 115 corresponding to the retainer has a radial size larger than that of the portion of the nozzle 115b generally corresponding to the second ball 104, a large amount of grease can be charged from the portion of the nozzle 115 corresponding to the retainer. It is noted that the nozzle may have an annular configuration throughout the entire circumference in the circumferential direction or may exist only partially in the circumferential direction. When the nozzle has an annular configuration, the grease can be charged generally uniformly in the circumferential direction, and seizure of the parts such as the first ball and the second ball can reliably be prevented.

According to the hub unit manufacturing method of the above embodiment, the first distance "a" and the second distance "b" are measured in the state in which the shaft 101, the outer ring 105, the first ball 103 and the second ball 104 are assembled, and the size in the axial direction of the inner ring 102 is adjusted in accordance with the first distance "a" and the second distance "b". Therefore, even if there are dimensional variations of the shaft 101, dimensional variations of the outer ring 105, dimensional variations of the first ball 103 and dimensional variations of the second ball 104, the axial gap of the hub unit can be correctly set by adjusting the size in the axial direction of the inner ring 102. Moreover, even if there are similarly shaft measurement variations of the measuring instrument for measuring the size of the shaft 101 and outer ring measurement variations of the measuring instrument for measuring the size of the outer ring 105, the axial gap of the hub unit can be correctly set by adjusting the size in the axial direction of the inner ring 102. Therefore, the variations in the axial gap of the hub unit can be reduced more remarkably than in the conventional case, and the axial gap can be correctly set to the prescribed value. And in regards to the hub unit, the durability, the performance of the load capacity and further capability can be remarkably improved. Moreover, since the gap variations can be reduced, a compact light-weight hub unit can be achieved.

Moreover, according to the hub unit manufacturing method of the above embodiment, it is not necessary to carry out the dimensional measurement of the shaft 101, the dimensional measurement of the inner ring 102 and the dimensional measurement of the outer ring 105. Therefore, the production time of the hub unit can be remarkably shortened.

Moreover, according to the hub unit manufacturing method of the above embodiment, the interference between the shaft 101 and the inner ring 102 is calculated by measuring the inside diameter of the inner ring 102 and the outside diameter of the small diameter shaft portion of the shaft 101 and the size in the axial direction of the inner ring 102 is adjusted in accordance with the calculated interference. Therefore, even if the axial gap of the hub unit varies depending on the magnitude of interference, i.e., even if the axial gap of the hub unit varies depending on the strength of press fitting of the inner ring 102, the axial gap of the hub unit can be correctly set by adjusting the size in the axial direction of the inner ring 102. Therefore, the axial gap of the hub unit can be brought closer to the prescribed value.

Moreover, according to the hub unit manufacturing method of the above embodiment, the size in the axial direction of the inner ring 102 is adjusted in accordance with the temperatures of the shaft 101, the inner ring 102, the first ball 103, the second ball 104 and the outer ring 105. Therefore, even if the sizes of the parts are varied by thermal expansion, the axial gap of the hub unit can be correctly set by adjusting the size in the axial direction of the inner ring 102. Therefore, the axial gap of the hub unit can be brought closer to the prescribed value.

Moreover, according to the hub unit manufacturing method of the above embodiment, the size in the axial direction of the inner ring 102 is adjusted in accordance with the variations in the axial gap due to calking effected on the end surface of the inner ring 102 side of the shaft 101, after the shaft 101, the inner ring 102, the first ball 103, the second ball 104 and the outer ring 105 are assembled. Therefore, even if the axial gap of the hub unit varies due to calking effected on the end surface in the inner ring 102 side of the shaft 101, the axial gap of the hub unit can be correctly set by adjusting the size in the axial direction of the inner ring 102. Therefore, the axial gap of the hub unit can be brought closer to the prescribed value.

Moreover, according to the hub unit manufacturing method of the above embodiment, grease is charged in between the first ball 103 and the second ball 104 in the space between the shaft 101 and the outer ring 105 after the first distance "a" and the second distance "b" are measured and the inner ring 102 of which the size in the axial direction has been adjusted is fit to the shaft 101 after the grease is charged. Therefore, the grease exerts no influence on the measurements of the first distance "a" and the second distance "b" and the axial gap of the hub unit can be accurately adjusted to the prescribed value.

Moreover, according to the hub unit manufacturing method of the above embodiment, since the parts assembled once need not be disassembled for the charging of the grease, time to manufacture the hub unit can be shortened, and the manufacturing cost of the hub unit can be reduced.

Figure 4:
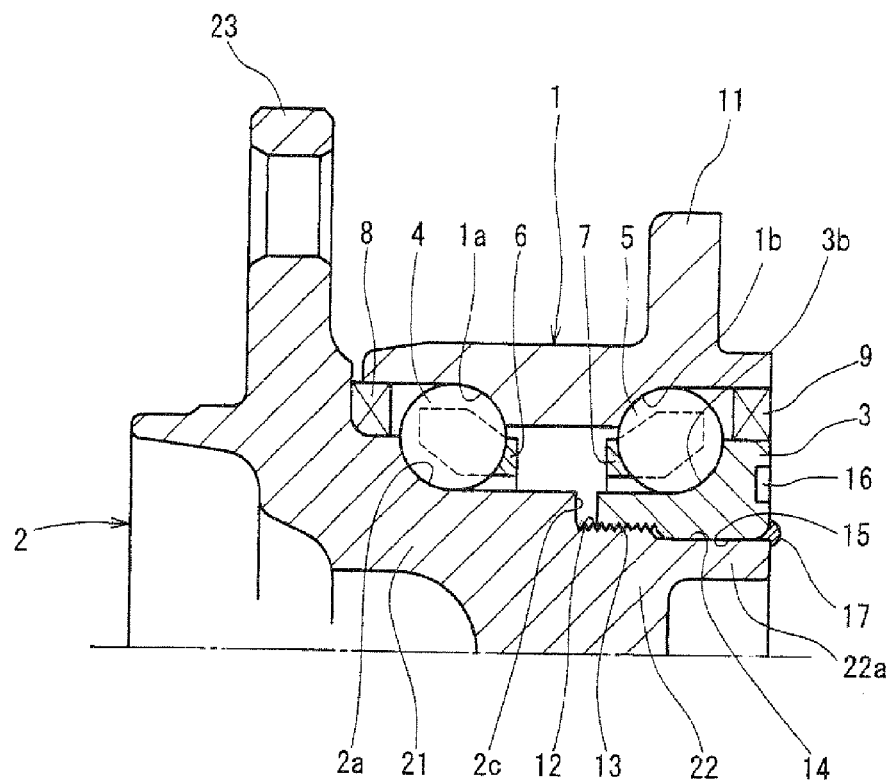
FIG. 4 is a half sectional view of a hub unit of one embodiment of the present technology.
Figure 5:
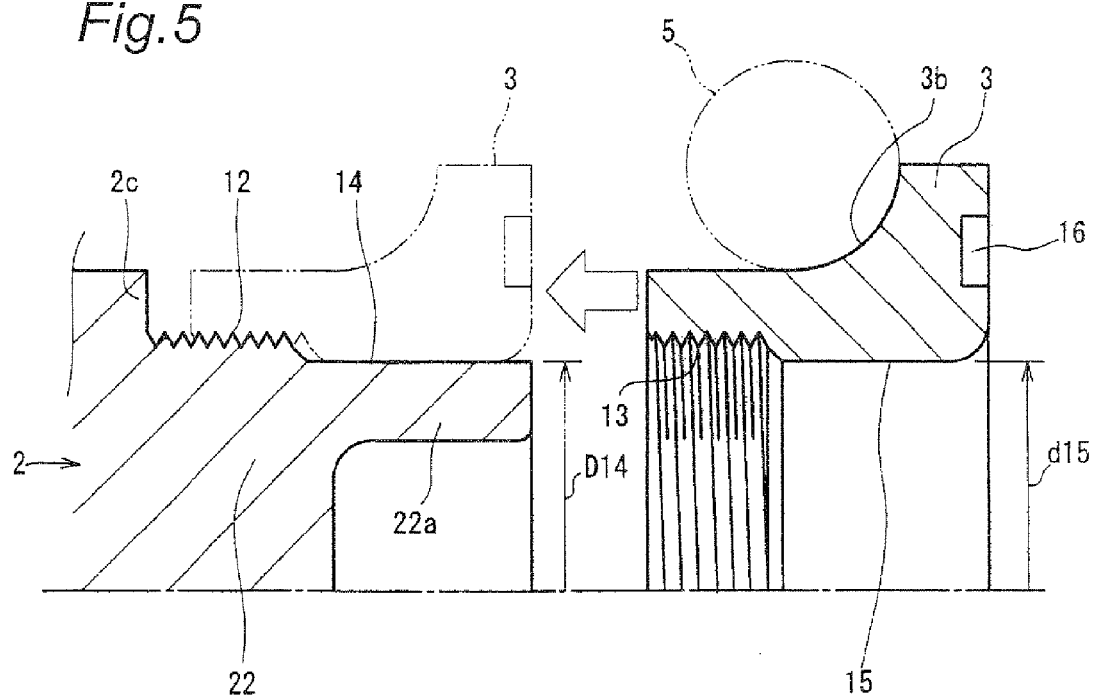
FIG. 5 is an enlarged sectional view showing the essential part of the hub unit of the one embodiment in a disassembled style.

FIG. 4 is a half sectional view of a hub unit of one embodiment of the present technology, and FIG. 5 is an enlarged sectional view showing the essential part of the hub unit of FIG. 4 in a disassembled style.

As shown in FIG. 4, the hub unit is a double row angular contact ball bearing device type, which includes an outer ring 1, a shaft (inner shaft) 2, an inner ring 3 and balls 4 and 5 as rolling elements.

The outer ring 1 has a flange portion 11 on the it's outer peripheral surface to fix to a member situated in the vehicle body side and has inner peripheral raceway surfaces 1a and 1b arranged axially in double rows on its inner peripheral surface. The shaft 2 has a large diameter portion 21 located on one axial side (left-hand side in FIG. 4) and a small diameter shaft portion 22 located on the other axial side (right-hand side in FIG. 4). On the outer peripheral surface of the large diameter portion 21 are provided a flange portion 23 which is directed radially outwardly and to which a wheel is fixed as well as an outer peripheral raceway surface 2a of a single row opposite to one inner peripheral raceway surface 1a of the outer ring 1. The inner ring 3 is mounted on the outer periphery of the small diameter shaft portion 22. The inner ring 3 has an outer peripheral raceway surface 3b of a single row opposite to the other inner peripheral raceway surface 1b of the outer ring 1.

A plurality of balls 4 and 5 are retained by retainers 6 and 7, respectively. A plurality of balls 4 and 5 are placed between one inner peripheral raceway surface 1a of the outer ring 1 and the outer peripheral raceway surface 2a of the shaft 2 and between the other inner peripheral raceway surface 1b of the outer ring 1 and the outer peripheral raceway surface 3b of the inner ring 3, respectively. Seals 8 and 9 are provided between one axial side of the outer ring 1 and the shaft 2 and between the other axial side of the outer ring 1 and the inner ring 3, respectively.

Screw engagement portions 12 and 13 for enabling the adjustment of the axial position of the inner ring 3 by screw rotation of the inner ring 3 with respect to the shaft 2 are provided on a mounting contact surface between the small diameter shaft portion 22 of the shaft 2 and the inner ring 3. As clearly shown in FIG. 5, the screw engagement portion 12 located in the small diameter shaft portion 22 is constructed of a male screw and is formed on the outer peripheral surface of the small diameter shaft portion 22 from a stepdown portion 2c of the small diameter shaft portion 22 to a position in the neighborhood of the center of the small diameter shaft portion 22. The screw engagement portion 13 located on the inner ring 3 is constructed of a female screw and is formed on the inner peripheral surface of inner ring 3 in a position located axially closer to the inside end side than the outer peripheral raceway surface 3b.

In the construction in which the small diameter shaft portion 22 of the shaft 2 and the inner ring 3 are joined together in screw engagement by using the screw engagement portions 12 and 13 as described above, due to the backlash of the threaded portions, there is a possibility that the inner ring 3 might become cranky, rigidity might descend or misalignment of the center axis of the outer peripheral raceway surface 3b of the inner ring 3 with respect to the center axis of the shaft 2 might occur. Accordingly, the hub unit of the present technology is also characterized in that fitting portions 14 and 15 are provided. The fitting portions 14 and 15 are used to concentrically couple the inner ring 3 with the small diameter shaft portion 22 of the shaft 2 by interference fit on the mounting contact surface between the small diameter shaft portion 22 of the shaft 2 and the inner ring 3. The fitting portions 14 and 15 are located in a position axially on the axial outer end side of the hub unit with respect to the screw engagement portions 12 and 13. The outside diameter of the outer peripheral surface of the fitting portion 14 is smaller than the outside diameter of the screw engagement portion 12 and the inside diameter of the fitting portion 15 is smaller than the inside diameter of the screw engagement portion 13.

The fitting portion 14 located in the small diameter shaft portion 22 is constructed of a cylindrical outer peripheral surface. The fitting portion 14 is formed in a position located axially closer to the outer end side than the screw engagement portion 12 on the outer periphery of the small diameter shaft portion 22. The fitting portion 15 located on the inner ring 3 is constructed of a cylindrical inner peripheral surface. The fitting portion 15 is formed in a position located axially on the outer end side than the screw engagement portion 13 on the inner periphery of the inner ring 3. Its axial position overlaps the axial position of the outer peripheral raceway surface 3b of the inner ring 3. As shown in FIG. 5, the fitting portion 15 located on the inner ring 3 has an inside diameter d15 that is slightly smaller (about 5 to 20 µm in concrete) than the outside diameter D14 of the fitting portion 14 on the small diameter shaft portion 22 side (D14>d15) so as to be engaged with the fitting portion 14 located in the small diameter shaft portion 22 with a negative gap. Recess portions 16 to be engaged with a jig for screw rotation operation are formed in several places in the circumferential direction on the outer end surface of the inner ring 3.

The screw engagement portion 13 located on the inner ring 3 is screwed together with the screw engagement portion 12 located in the small diameter shaft portion 22 as well as the fitting of the fitting portion 15 located on the inner ring 3 is fitted the fitting portion 14 located in the small diameter shaft portion 22. In this way, the inner ring 3 is mounted on the small diameter shaft portion 22. Then, the outer end portion of the thus-mounted inner ring 3 is welded to the outer end portion of the small diameter shaft portion 22. The inner ring 3 is firmly fixed to the small diameter shaft portion 22 by using the welded portion 17.

In the hub unit of the above construction, by screw rotation of the inner ring 3 in relation to the small diameter portion 22 in a state in which the inner ring 3 is in screw engagement with the small diameter shaft portion 22 of the shaft 2, the screw engagement depth of both the screw engagement portions 12 and 13 is changed. In this way, the axial position of the inner ring 3 is finely tuned and the preload or the axial gap is set to the prescribed value. After the preload or the axial gap is set, the inner ring 3 is firmly fix to the small diameter shaft portion 22 of the shaft 2.

Moreover, the rigidity reduction of the inner ring 3 and the misalignment of the outer peripheral raceway surface 3b of the inner ring 3, which are caused by the screw engagement between the small diameter shaft portion 22 of the shaft 2 and the inner ring 3, are prevented or suppressed by the fitting of the fitting portions 14 and 15, and the inner ring 3 is fixed concentrically integrally to the small diameter shaft portion 22 of the shaft 2.

As described in the above embodiment, with the construction in which the fitting portion 15 is positioned inside the outer peripheral raceway surface 3b of the inner ring 3, the screw engagement portion 13 exerts almost no influence on the outer peripheral raceway surface 3b, and the misalignment of the outer peripheral raceway surface 3b can be reliably prevented.

Figure 6:
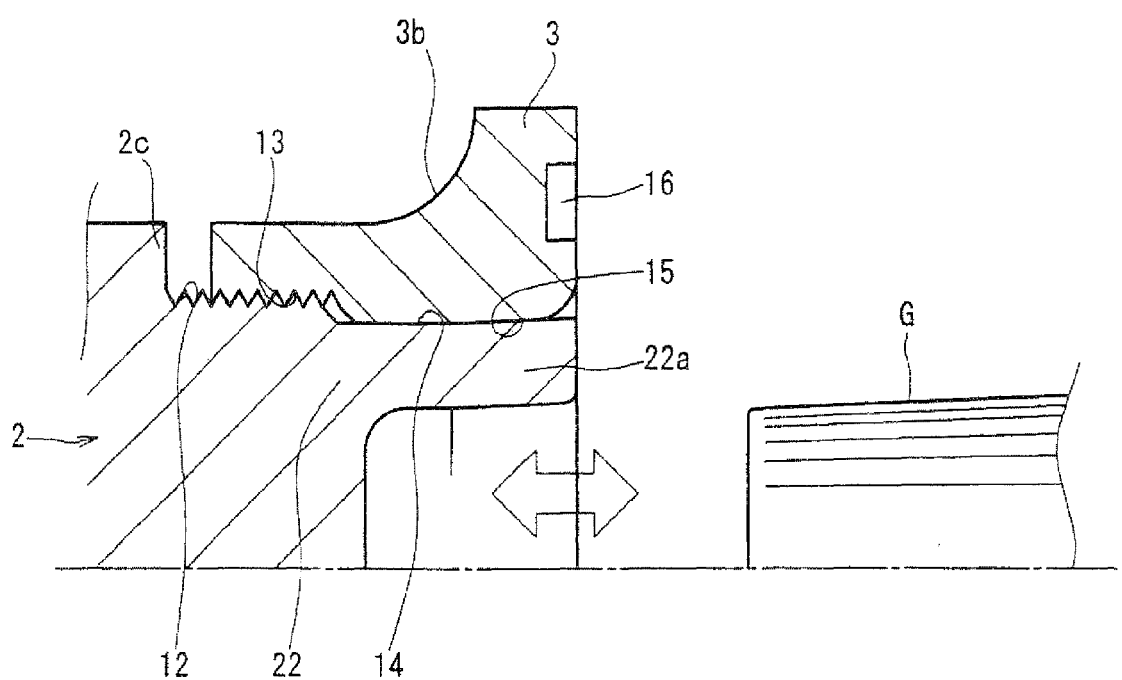
FIG. 6 is a sectional view of the essential part of a hub unit of another embodiment of the present technology.

FIG. 6 is a sectional view of the essential part of a hub unit according to another embodiment of the present technology. In the present embodiment, the screw engagement portion 13 located on the inner ring 3 is screwed together with the screw engagement portion 12 located in the small diameter shaft portion 22 as well as the fitting of the fitting portion 15 located on the inner ring 3 is fitted the fitting portion 14 located in the small diameter shaft portion 22. In this way, the inner ring 3 is mounted on the small diameter shaft portion 22. Thereafter by expanding the diameter of a cylindrical portion 22a in the axial outer side of the small diameter shaft portion 22 by axially thrusting a tapered diameter expansion jig G, the inner ring 3 is firmly fix to the small diameter shaft portion 22 of the shaft 2. The diameter expansion jig G is only required to have a small angle of, for example, an expansion angle of not greater than 10 degrees. The amount of diameter expansion of the cylindrical portion 22a of the small diameter shaft portion 22 is adjusted by correctly setting the thrusting depth in the axial direction of the diameter expansion jig G.

Besides the above, in order to fix the inner ring 3 to the small diameter shaft portion 22 of the shaft 2, it is acceptable to use an adhesive. For example, an adhesive can be charged in the screw engagement portion. Also, the fitting portions 14 and 15 of the small diameter shaft portion 22 and the inner ring 3 may be had a role as fixing portions fixing the small diameter shaft portion 22 to the inner ring 3.

The positional relation between the screw engagement portions 12 and 13 and the fitting portions 14 and 15 is not limited to the illustrated example, and the fitting portions 14 and 15 are formed in an axially inward position than the screw engagement portions 12 and 13 with a diameter smaller than that of the fitting portions 14 and 15. Moreover, a configuration obtained by combining both of them is acceptable.

The present technology can be applied to a hub unit for a driving wheel such that a drive shaft is put through and fixed to an axial hole located in a center portion of the shaft. Moreover, the technology is not limited to the hub unit of the ball bearing device type but allowed to be applied also to a hub unit of another type that employs, for example, tapered rollers.

The invention claimed is:

1. A hub unit manufacturing method for manufacturing a hub unit, the hub unit comprising:
   a shaft having a small diameter shaft portion and a large diameter shaft portion that connects to the small diameter shaft portion via a stepped portion and has an outside diameter larger than an outside diameter of the small diameter shaft portion and an outer peripheral raceway surface;

an inner ring that is fit to the small diameter shaft portion of the shaft and has an outer peripheral raceway surface;

an outer ring having a first inner peripheral raceway surface and a second inner peripheral raceway surface;

a first rolling element placed in between the first inner peripheral raceway surface and the outer peripheral raceway surface of the shaft; and a second rolling element placed in between the second inner peripheral raceway surface and the outer peripheral raceway surface of the inner ring, the method comprising:

placing the second rolling element in between the second inner peripheral raceway surface and an outer peripheral surface of the small diameter shaft portion as well as assembling the first rolling element in between the first inner peripheral raceway surface and the outer peripheral raceway surface of the large diameter shaft portion;

measuring a first distance from a plane generally perpendicular to a central axis of the shaft to the second rolling element and a second distance from the plane to the stepped portion of the shaft; and adjusting a size in an axial direction of the inner ring based on a difference between the first distance and the second distance.

2. The hub unit manufacturing method as claimed in claim 1, further comprising calculating an interference between the small diameter shaft portion of the shaft and the inner ring by measuring an inside diameter of the inner ring and an outside diameter of the small diameter shaft portion of the shaft and wherein adjusting the size in the axial direction of the inner ring is also performed in accordance with the calculated interference.

3. The hub unit manufacturing method as claimed in claim 1, further comprising measuring temperatures of the shaft, the inner ring and the outer ring before the hub unit is assembled and wherein adjusting the size in the axial direction of the inner ring is also performed in accordance with the temperatures of the shaft, the inner ring and the outer ring.

4. The hub unit manufacturing method as claimed in claim 1, wherein the size in the axial direction of the inner ring is also adjusted in accordance with variations in an axial gap of the hub unit due to caulking effected on an end surface in the inner ring side of the shaft in order to fix the inner ring to the shaft, after the shaft, the inner ring, the first rolling element, the second rolling element and the outer ring are assembled.

5. The hub unit manufacturing method as claimed in claim 1, further comprising:

charging a grease in between the first rolling element and the second rolling element in a space between the shaft and the outer ring after the first distance and the second distance are measured; and fitting the inner ring of which the size in the axial direction has been adjusted to the small diameter shaft portion of the shaft after the grease is charged.

* * * * *